May 22, 1928. 1,670,524
G. M. SACHS
SEA AIR PORT
Filed Aug. 18, 1927 2 Sheets-Sheet 1
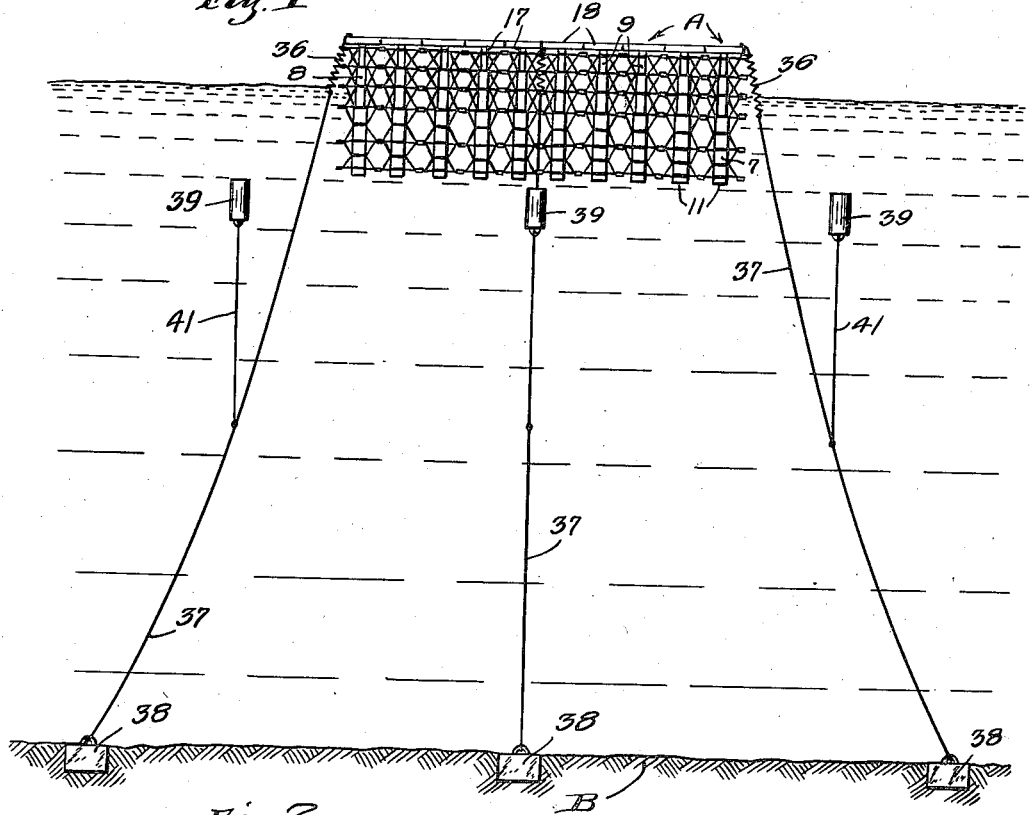
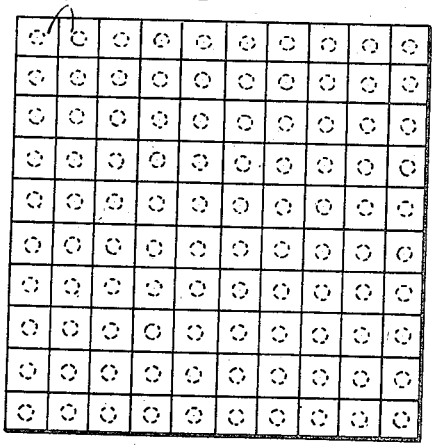
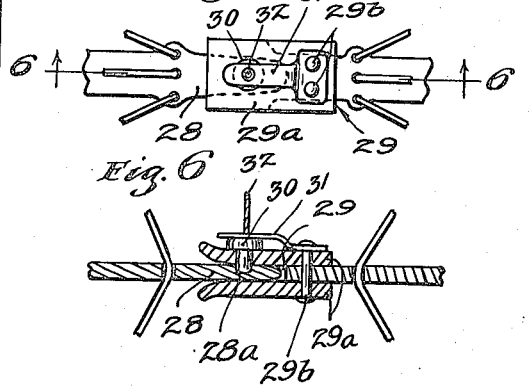
INVENTOR.
GUSTAVE M. SACHS.
BY HIS ATTORNEYS.

May 22, 1928.　　　　　　　　　　　　　　　　1,670,524
G. M. SACHS
SEA AIR PORT
Filed Aug. 18, 1927　　　2 Sheets-Sheet 2
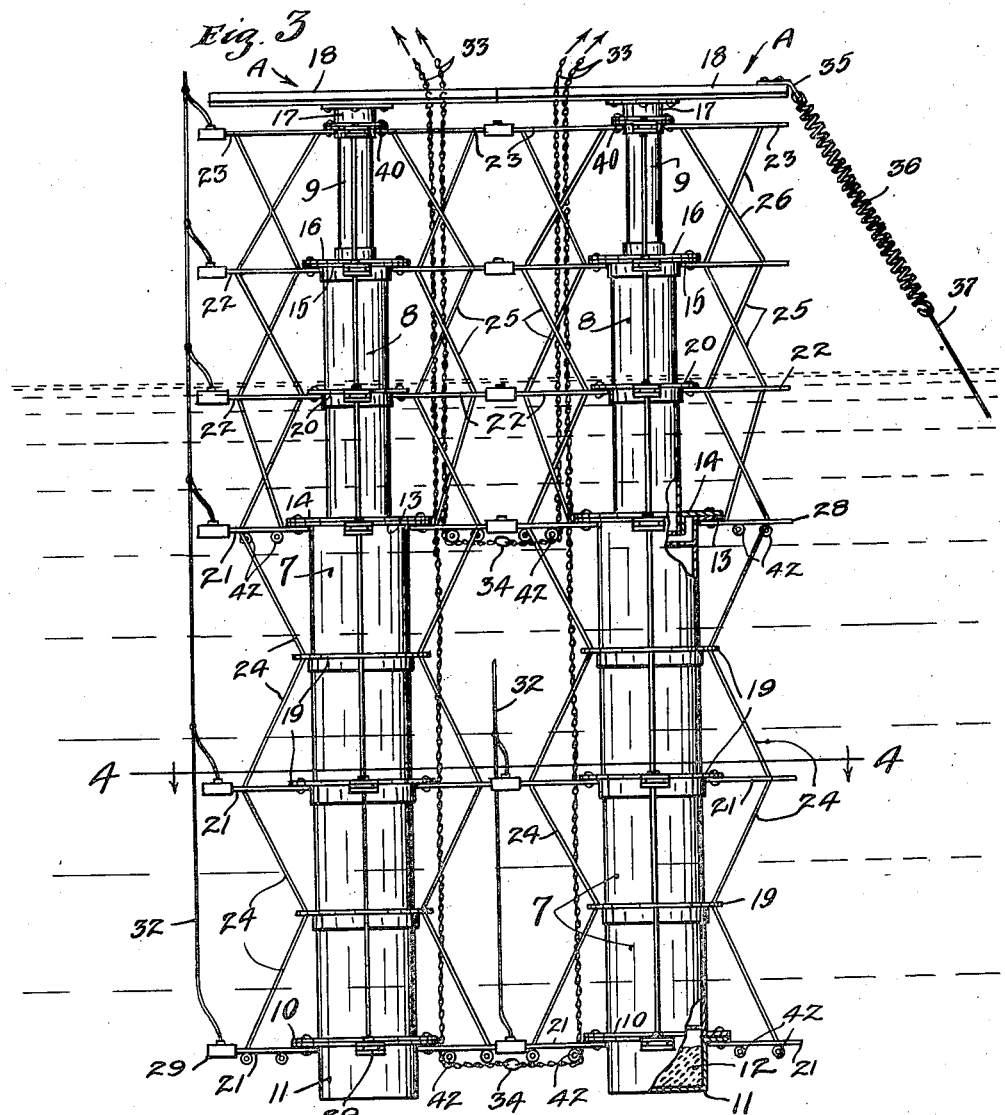
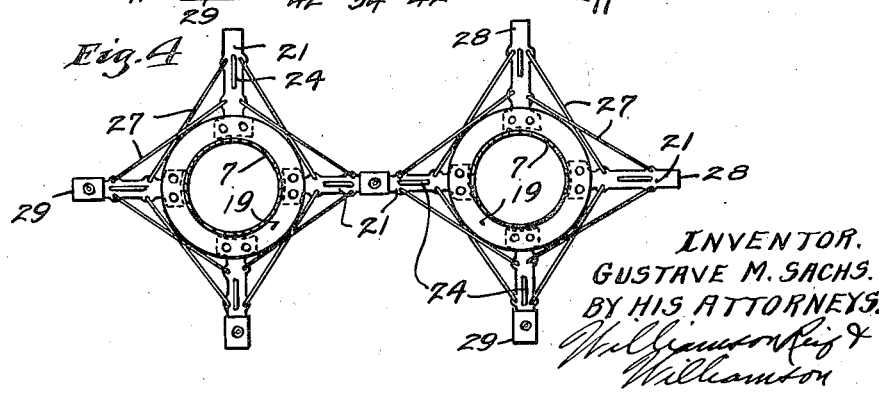
INVENTOR.
GUSTAVE M. SACHS.
BY HIS ATTORNEYS.

Patented May 22, 1928.

1,670,524

UNITED STATES PATENT OFFICE.

GUSTAVE M. SACHS, OF EDINA, MINNESOTA.

SEA AIR PORT.

Application filed August 18, 1927. Serial No. 213,827.

This invention relates to sea air ports. Recently transoceanic air transportation has been given a great stimulus and it seems quite probable that before long regular air lines will be established across the ocean. Heretofore the main drawback to the development of transoceanic air transportation has been the lack of stations in mid-ocean where the air craft could stop for refueling or for similar purposes. To date, no practical sea air port has been devised which can successfully be moored in mid-ocean to withstand the oceanic storms and waves and tide to hold its positions under all circumstances. Also no oceanic air port has been provided which is capable of being readily assembled and put together in mid-ocean.

It is an object of this invention, therefore, to provide a sea air port which is composed from a plurality of separable float units, the said units being capable of being brought to midocean and assembled together, one unit at a time.

It is a further object to provide a unit for such a device comprising a plurality of air tanks, one tank being superimposed on top of another tank, the lowermost of said tanks being adapted to extend below the water level at such a depth as to be unaffected by waves, wind or storm.

Yet another object is to provide such a unit wherein the lowermost tank is of considerably greater diameter than the uppermost tank and a ballast at the lower end of the lowermost tank lending stability to the unit.

Another object is to provide a sea air port comprising a platform formed from a series of unit floats, and means for assembling said units, one unit at a time, said means being operatable entirely above the water level.

Yet another object is to provide in such a structure, means for maintaining the platform at a constant level in respect to the top surface of the water irrespective of the state of the tide.

A more specific object is to provide a sea air port comprising a landing platform adapted to float above the top surface of the water, weighted cables extending from the platform to the sea floor and resilient means interposed in the cable lines to permit the tide to raise or lower the said platform without changing the relative distance of the platform from the top of the water.

One more object is to provide means for buoying up said cables to support part of the weight thereof.

These and other objects and advantages of the present invention will more fully appear from the following description made in connection with the accompanying drawings, wherein like reference characters refer to the same or similar parts throughout the various views, and in which, Fig. 1 is a view in side elevation showing the assembled device moored in mid-ocean;

Fig. 2 is a plan view of the landing platform;

Fig. 3 is a view in side elevation showing two of the units forming the platform in assembled relation;

Fig. 4 is a vertical section taken on the line 4—4 of Fig. 3, as indicated by the arrows;

Fig. 5 is a plan view on an enlarged scale illustrating a type of coupling that may be used for securing two units of the device together, and;

Fig. 6 is a vertical section taken on the line 6—6 of Fig. 5, as is indicated by the arrows.

Referring to the drawings, the sea air port comprises in general a platform formed from a plurality of assembled float units A, and moored to the ocean floor B. Each unit A comprises a series of air tanks placed one on top of another, the said air tanks being successively smaller from bottom to top, and a flooring carried at the top of the uppermost air tank. In the drawings, the units A are each shown as including a large lowermost air tank 7, a medium sized middle air tank 8, and a small upper air tank 9. The tank 7 has an outwardly extending flange 10 at its bottom end to which is secured a cap 11 containing heavy material 12, such as concrete, to form a ballast at the bottom of the said tank. A flange 13 is provided at the top of tank 7 and the tank 8 is provided at its lower end with a flange 14 bolted or otherwise secured to the flange 13. Similarly, the tank 8 is provided at its upper end with a flange 15 secured to a bottom flange 16 at the lower end of tank 9. The lower ends of the said tanks 8 and 9 are adapted to fit downwardly within recesses formed in the upper ends of tanks 7 and 8 respectively to which they are joined. The upper end of tank 9 has a flange 40 to which the lower flange of a small standard 17 is secured, said standard having a horizontally disposed flange at the top thereof to which a flooring 18 is secured in any suitable manner. The flooring 18 is preferably of square shape although, if desired, the same may take the shape of any regular polygon. The tanks 7, 8 and 9, as shown, are preferably of the hollow cylindrical type and are so arranged that their radial axes will fall in the same vertical line. It will, of course, be understood that the means for securing the tanks to each other and for fixing the ballast 12 and the flooring 18 to the lower and upper tanks respectively may be varied as desired. It will also be understood that any desired number of tanks may be substituted for the three tanks 7, 8 and 9.

In the drawings, the tank 7 is illustrated as being provided with three horizontally flanged sleeves 19 welded or otherwise secured to the tank, while the tank 8 is illustrated as having a single sleeve 20 similarly secured to the tank and having a horizontal flange. Heavily constructed arms 21 are secured to each of the flanges 10 and 13 and the center flange 19. The said arms are four in number secured to each of said flanges, are disposed radially in respect to the tank 7, and are set at 90 degree angles to each other. Arms 22 are similarly secured to each of the flanges 20 and 15 of tank 8, while arms 23 are similarly secured to the flange 40 of tank 9. The various arms 21, 22 and 23 extend outwardly from the various tanks 7, 8 and 9 to terminate at equal radial distances from the concentric center of said tanks, and the said arms are vertically alined with each other in four planes set at 90° angles to each other. Diagonal bracing rods 24 disposed in vertical planes extend between the outer ends of the various arms 21 and the sleeves 19 to which the arms are not otherwise secured. Similar diagonal bracing rods 25 disposed in vertical planes extend between the outer ends of arms 22 and the upper arms 21 to the flanges 13, 20 and 15, while similar diagonal bracing rods 26 extend between the outer ends of the upper arms 22 and the arms 23 to the flange 15 and to the flange 40. Suitable bracing rods 27 extend between the outer ends of the various arms 21, 22 and 23 to the inner ends of adjacent arms, the said bracing rods 27 being disposed in substantially horizontal planes. It will be understood that the number and type of arms 21, 22 and 23 and the bracing therefor may be varied as desired.

The outer ends of the arms 21, 22 and 23 are provided with suitable male and female coupling portions, whereby the arms of one unit may be connected up with the arms of adjacent units. Preferably, two arms secured to each flange will be provided with male coupling portions 28 while the two other arms will be provided with female coupling portions 29, so that oppositely extending arms will carry one male coupling portion and one female coupling portion. To form the male coupling portion 28 said various arms are merely extended and provided with rounded end portions and with recesses 28$^a$ at their upper sides. To form the female coupling portions horizontally extending plates 29$^a$ are provided which are bolted or riveted as by rivets 29$^b$ to the outer ends of the said arms. The said plates 29$^a$ are outwardly bent from each other at their outer ends and are spaced from each other to form recesses within which the male coupling members 28 are adapted to fit. Pins 30 are provided which fit through openings on the upper plates 28$^a$ and are spring pressed by bar springs 31 to hold the same projecting between the opening between the two plates 29$^a$. It will be seen that as the male coupling member 28 is pressed into the female coupling member 29 that the rounded end of the male member will force the pin 30 upwardly against the tension of spring 31 thereby causing the pin to be forced downwardly into the recess 28$^a$ to lock the members together after being brought further together. Cables 32 are connected to each of the pins 30 disposed in a single vertical plane and extend from the lowest arm 21 to adjacent the flooring 18. By moving the cable 32 vertically upwardly all the pins 30 connected to the cable can be raised against the tension of springs 29 out of engagement with the various recesses 28$^a$ to permit release of the male and female coupling members. The type of coupling used may be varied as desired.

Chains or cables 33 are provided on each unit which are adapted to be connected by links 34 to similar chains 33 of adjacent units to afford means for pulling and securing the said units together. The chains 33 extend downwardly through the flooring 18 to pulleys 42 fixed to the lowermost and uppermost arms 21 of the bottom tank and before assembly the chains are extended upwardly from said pulley to the outer side of the platform 18. When it is desired to assemble two of the units A the two units are turned so that male coupling members of one unit oppose female coupling members of another unit. The ends of chains 33 at the sides of the platforms 18 are then connected by means of the links 34 and allowed to drop, whereupon by pulling the other ends of the chains the two units will be drawn toward each other to cause the various male couplings on one side thereof to engage with female couplings on the opposing side of the other unit. After the units have been so drawn together chains 33 may be securely fastened to assist in binding the said units together and retaining the same in assembled position.

After the whole float platform of the air port has been assembled, unit by unit, in such a manner it becomes desirable to moor the platform. Preferably the middle units on each side of the platform of the device will be provided with brackets 35 at their outwardly projecting edges and some resilient means such as the coiled spring 36 illustrated in the drawings will be connected at one end to the brackets 35. Long cables 37 will be secured at their upper ends to the other ends of said resilient means and extend downwardly therefrom to the sea floor and will have secured thereto at their lower ends weights 38 resting on the sea floor. Float tanks 39 are preferably provided, which are connected by cables 41 to said cables 37 at medial points thereon to assist in carrying the weight of said cables.

When a number of the units A have been assembled as indicated in Fig. 2, a smooth and even surfaced air craft landing field will be provided. The field can, of course, be laid out to form hangars, sleeping accommodations, etc., if desired.

In practice, the various air tanks 7, 8 and 9 will be of such size as to sustain the platform at a height above the water level sufficient so that the highest waves caused by the worst storms will never strike the bottom of the platform formed by the floorings 18. The bottom tanks 7 will be sunk in the water so deep by means of the ballast 12 that movement of the surface water caused by waves, wind or storm will not in any way affect the said tanks. The platform 12 will be preferably of such weight as to carry the units downwardly to such a point that the normal surface level of the water will about reach the middle of the medial tanks 8, as is indicated in Fig. 1. The tanks 8 and 9 being of much smaller diameter than the lower tanks 7 will offer but comparatively slight wind and wave resistance so that there will be no tendency for the assembled structure to pitch and roll in the stormiest of weather, due to the stabilating effect exerted by the weighted lower tanks. Due to the springs 36 or other resilient means the air port when moored will be allowed to rise or fall with the tide so that the platform formed from the floorings 18 will always remain at approximately the same level relative to the top surface of the water. The air tanks 39 are situated at such a distance below the surface of the water that they will not interfere with ships traveling in the ocean and the said tanks will serve to support in a measure the weight of the various mooring cables 37.

The various units A may be either constructed on land and carried out to sea by specially constructed boats, one at a time, or if desired, the units may be built in mid ocean and assembled as completed.

In order that some idea of the relative sizes of the parts may be obtained it might be stated that the inventor contemplates maintaining his platform about 48 feet above the water level, making his lower tanks 7 about 96 feet in height, his middle tanks 8 about 48 feet in height and his upper tanks 9 about 24 feet in height. The ocean is about three miles deep at its deepest point, so that in situating the air port in midocean the cables 37 will be about 3¾ miles long, the weights 38 being situated outwardly from the sides of the platform about one mile in distance. The tide in mid-ocean raises about 6 feet so that the springs 36 or other resilient means will be of such size as to vary in length approximately 6 feet. The weight of the various cables 37 will cause the same to sag at their central portions which will give an added resiliency to the cables. The sizes and dimensions of the various parts above given can be varied considerably to suit various conditions.

It will, of course, be understood that various changes and modifications may be made in the form, details, arrangement and proportions of the parts without departing from the scope of the present invention, which, generally stated, consists in the matter shown and described and set forth in the appended claims.

What is claimed is:

1. A sea air port comprising a platform and a plurality of sets of floats rigidly fixed thereto, each float comprising a series of superimposed air tanks of successively smaller size from bottom to top, and means for retaining the lowermost tanks at such a depth below sea level that the same will not be affected by wind, waves or storm and will maintain said platform in stable equilibrium.

2. A sea air port comprising a platform and a plurality of sets of floats rigidly fixed thereto, each set of floats comprising an upper air tank of comparatively small surface area adapted to rest adjacent the sea level and a lower air tank connected to said upper tank and of comparatively great surface area and weighted at its bottom to retain the same at a depth below sea level sufficient to be unaffected by surface water conditions to maintain said platform in stable equilibrium.

3. A sea air port comprising a continuous platform situated above the highest water level and formed from a plurality of float units, each unit comprising a large air tank weighted at its lower end and situated at such a depth in the sea as to be unaffected by surface waves or winds and graduatingly smaller air tanks situated above said large tank, the uppermost of said tanks supporting a small unit section of the platform.

4. A sea air port comprising a structure formed from a plurality of separable units, secured together, each unit comprising a series of superimposed air tanks of successively smaller size from bottom to top, a ballast in the lower end of the bottom tank and a flooring carried at the top of the uppermost tank, whereby the lowermost tank will be maintained below sea level at such a depth as to be unaffected by surface water conditions.

5. A sea air port comprising a platform supported by floats to extend a considerable distance above the highest possible water level, resilient means connected to the outer sides of said structure, weights resting on the sea floor and cables secured to and extending between said resilient means and said weights, said resilient means being adapted to stretch to permit a variance of height of said platform to permit said platform to remain at approximately the same height from the water line irrespective of tide or storm.

6. A sea air port comprising a plurality of float units, each unit comprising a flooring, a series of air tanks supporting said flooring, said tanks being of successively smaller size from bottom to top, means for assembling adjacent units together to match said floorings and form a flat air craft landing platform and means for anchoring said platform.

7. The structure defined in claim 6, and means on each of said units for automatic engagement with successive units to form a rigid structure as said units are brought together.

8. A sea air port comprising a plurality of float units, each unit comprising a flooring of regular polygonal shape and a series of air tanks supporting said flooring, said air tanks being of successively smaller sizes from bottom too top, means operative from said floorings for pulling adjacent units together to match said floorings, and provide a large smooth surfaced air craft landing platform, and means for mooring the assembled structure to the sea floor.

9. A sea air port comprising a plurality of float units, each unit comprising a flooring of regular polygonal shape and a series of air tanks supporting said flooring, said air tanks being of successively smaller sizes from bottom to top, means for coupling adjacent units together to form a rigid structure and to aline said floorings to form a large smooth surfaced air craft landing platform, and means for mooring the assembled structure to the sea floor.

10. A sea air port comprising a plurality of float-units, each unit comprising a flooring of regular polygonal shape and a series of air tanks supporting said flooring, said air tanks being of successively smaller sizes from bottom to top, means operative from said floorings for pulling adjacent units together, and means automatically coupling said units together as pulled to aline said floorings and provide a large smooth faced air craft landing platform, and means for mooring the assembled structure to the sea floor.

11. The structure defined in claim 10, and means operative from said platform for uncoupling said units.

In testimony whereof I affix my signature.

GUSTAVE M. SACHS.